United States Patent [19]

DeWit

[11] Patent Number: 4,645,403

[45] Date of Patent: Feb. 24, 1987

[54] DISCHARGE INSTALLATION FOR A SILO

[76] Inventor: Cornelis L. DeWit, 5, Bruggerhuis, 5595 XA Leende, Netherlands

[21] Appl. No.: 729,286

[22] Filed: May 1, 1985

[30] Foreign Application Priority Data

May 2, 1984 [NL] Netherlands .......................... 8401399

[51] Int. Cl.⁴ ............................................. B65G 65/38
[52] U.S. Cl. .................... 414/317; 198/364;
222/413; 222/459; 414/298; 414/302; 414/320;
414/326
[58] Field of Search ............... 414/298, 302, 313, 317,
414/319, 320, 321, 299–301, 310, 326; 222/410,
413, 459; 198/778, 364, 612, 598

[56] References Cited

U.S. PATENT DOCUMENTS 1,867,462 7/1932 Mercer ................................ 414/299
3,278,054 10/1966 Stott ..................................... 414/299
3,358,856 12/1967 Weibull ............................... 414/298
3,554,392 1/1971 Ivstedt .............................. 414/298 X
4,138,021 2/1979 McKenzie .......................... 414/298
4,140,214 2/1979 Pellhammer .................... 198/669 X

FOREIGN PATENT DOCUMENTS 1780062 12/1958 Fed. Rep. of Germany ...... 414/313
1032110 6/1953 France ................................ 414/313
1234986 5/1960 France ................................ 414/317

Primary Examiner—Robert J. Spar
Assistant Examiner—David A. Bucci
Attorney, Agent, or Firm—Kramer and Brufsky

[57] ABSTRACT

A discharge installation to be used in a silo for bulk material in powdered or granular condition comprising a central column of interspaced annular collar plates surrounding a central discharge chute, subsequent collar plates merging into each other forming a mainly helical path, a traveling scraper device being provided in the space between subsequent collar plates.

10 Claims, 13 Drawing Figures

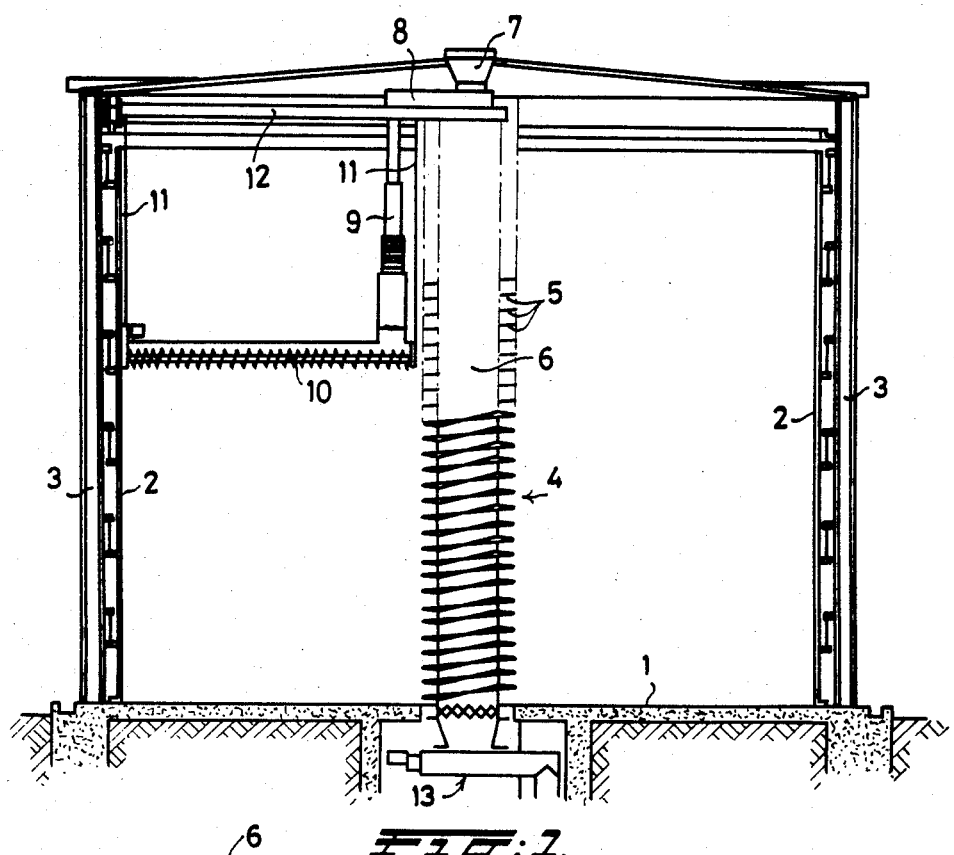
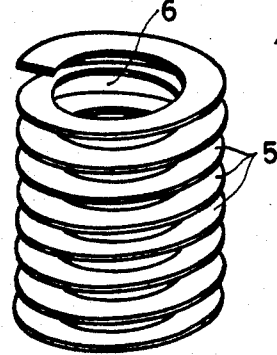
Fig: 2.
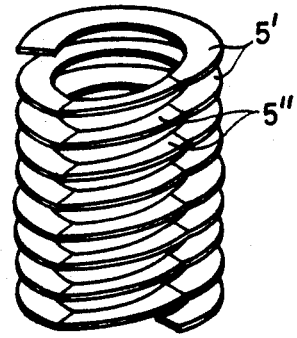
Fig: 3.

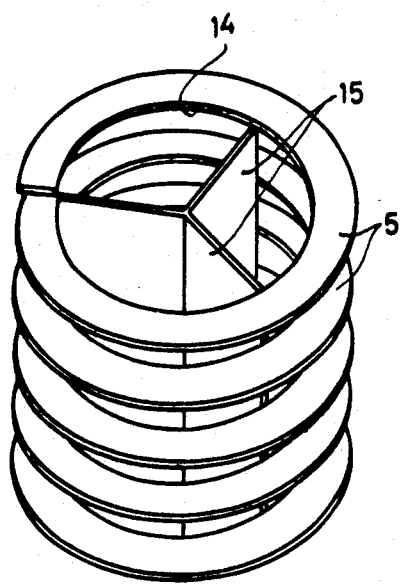
FIG: 4.
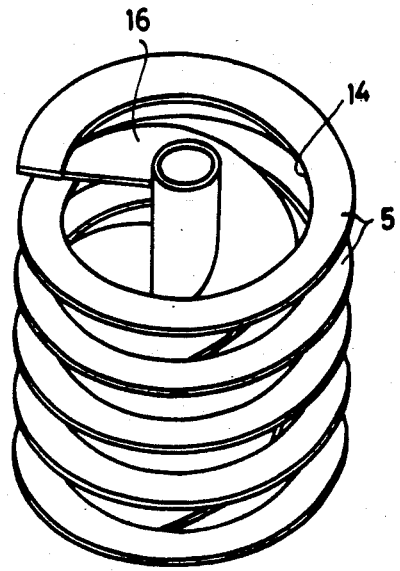
FIG: 5.
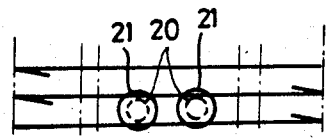
FIG: 7A.
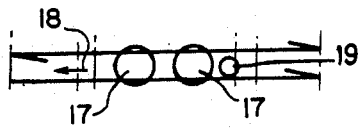
FIG: 7B.
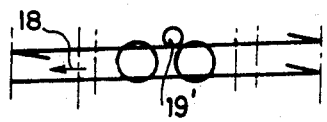
FIG: 7C.
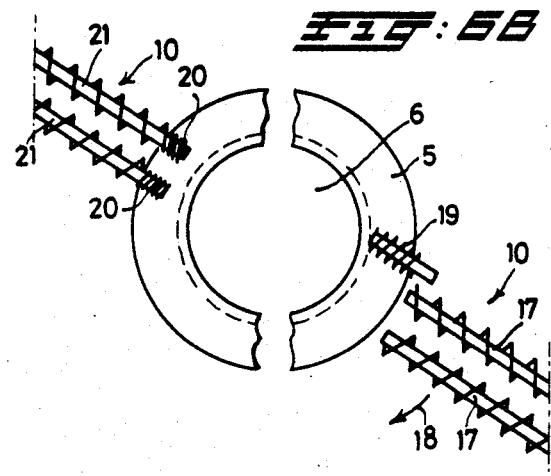
FIG: 6A.
FIG: 6B.

DISCHARGE INSTALLATION FOR A SILO

BACKGROUND OF THE INVENTION

The invention relates to a discharge installation to be used in a silo for bulk material in powdered of granular condition, comprising a column of collar plates disposed one above the other with a clearance and enclosing a central space forming a vertical discharge duct.

Such a discharge installation is known from German Offenlegungsschrift No. 1,914,600. In this case, the collar plates are provided with holes through which rods are fitted so as to form a column with said plates. This Auslegeschrift also discloses a discharge installation wherein the column is formed by helical collar plates.

It has become apparent, however, that for several types of bulk material to be stored in a silo the clearances between the collar plates get clogged nonetheless while there may occur arching of the material as well.

DESCRIPTION OF THE PRIOR ART

It has been proposed to provide the collar plates with a short hanging skirt along their outer circumference so that the stored material when being discharged must travel through a relatively narrowed passage between the collar plates whereupon the material will get more room between the collar plates while moving to the discharge duct. For certain kinds of material this proved sufficient to enable them to be properly discharged, but since the inner collar-plate circumference immediately about the discharge duct is smaller than the outer collar-plate circumference, there will nevertheless occur densification of the material on its way from the silo to the discharge duct. Also, there are materials causing a clogging in such discharge installation.

SUMMARY OF THE INVENTION

The object of the invention is to eliminate this drawback and to provide a discharge installation for a silo affording all bulk materials to be stored in the silo to be discharged without the occurrence of clogging due to arching or caking in a clearance between collar plates.

This object is attained according to the invention by using a discharge installation of the type described at the beginning which is characterized in that in the clearance there is provided a scraper device which revolves through a path of travel around a vertical discharge duct. This has the advantage of precluding the need for hanging skirts on the outer circumference of the collar plates and of ruling out any arching of the material stored in the silo when it is being discharged, and also of preventing the material from caking on to the collar plates.

The invention is particularly suitable for a discharge installation wherein, in the upward direction of the column, the clearances between the collar plates disposed one above the other merge into one another. This object is attained for example by having the collar plates run as a helix or in the case of horizontal collar plates by providing in a portion thereof an elevation leading to the collar plate disposed above it. It is then possible according to the invention that, in addition to its rotary movement about the discharge duct, the scraper device can perform a movement in vertical direction, and thus passes through the successive clearances merging into one another. It is then worthwhile for the scraper device to cooperate with a radial distribution and discharge conveyor provided for the bulk material in the silo and rotating about the column.

In a practical embodiment of the discharge installation according to the invention, the scraper device is a separate conveyor screw the lower side of the helical blades of which lies near the upper face of a collar plate. Preferably, the scraper device in the form of a conveyor screw forms part of one or several conveyor screws of the distribution and discharge conveyor.

The invention also relates to a column having collar plates about a central vertical discharge duct to be used for the discharge installation of the invention. In this case, the column is such that the collar plates are fixed with their edge facing the discharge duct to one or several partitions running through the discharge duct and that one or several partitions form a helical chute. Such an embodiment is particularly suitable in the event for example coal is to be stored in the silo. It is then worthwhile that within or in the vicinity of the central discharge duct there is provided a guide for one end of the scraper device.

The invention furthermore relates to a silo provided with a distribution and discharge conveyor provided with a discharge installation according to the invention. Such a silo is characterized in that the shape of the collar plates is adapted to the vertical component motion of the distribution and discharge conveyor.

DESCRIPTION OF THE DRAWINGS

FIG. 1 is a sectional view of a silo provided with a discharge installation according to the invention;

FIG. 2 is a perspective view of a portion of a column of collar plates having a helical shape;

FIG. 3 is a perspective view as that of FIG. 2, but with the major portion of the collar plates lying in one single plane and the neighboring collar plates being interconnected by means of an inclined portion;

FIG. 4 is a perspective view of a portion of the column of the discharge installation having partitions provided in the vertical discharge duct for fastening the collar plates;

FIG. 5 is a similar view as that of FIG. 4 but with a partition being in the form of a helical chute;

FIG. 6(a) is a diagrammatic top view of a portion of a discharge installation provided according to the present invention;

FIG. 6(b) is a diagrammatic top view of a portion of an alternative discharge installation provided according to the present invention;

FIG. 7(a) is a diagrammatic side view of a portion of the discharge installation of FIG. 6(a);

FIG. 7(b) is a diagrammatic side view of a portion of the discharge installation of FIG. 6(b);

FIG. 7(c) is a diagrammatic side view showing an alternative embodiment of a portion of the discharge installation of FIG. 7(b);

DESCRIPTION OF PREFERRED EMBODIMENTS

Figure 8:
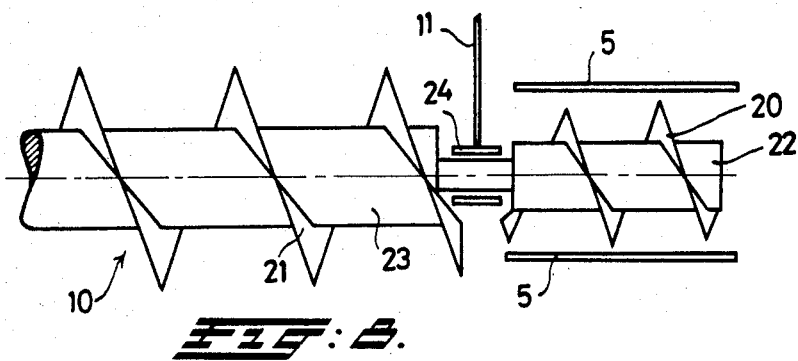
FIG. 8 is a diagrammatic side view of a portion of a distribution and discharge conveyor having a scraper device extending between two collar plates.

In FIG. 1, a cylindrical wall 2, externally supported by columns 3, is placed upon a foundation 1 in a known manner. In the center of the silo, there is provided in a known manner a column 4 of collar plates 5 disposed one above the other with proper interspacing and enclosing a space 6 forming a central vertical discharge duct. The material to be stored passes via a funnel 7, a filling device 8 of a known design and a telescoping shaft 9 to a point above the distribution and discharge conveyor 10 known per se. This conveyor may consist of one or several screw conveyors and runs directly over the material already stored in the silo. The conveyor is then suspended from cables 11 on a carrier 12 rotating in the silo. By retracting the cables 11, the conveyor 10 can be lifted upwards. The conveyor 10 so passed through the entire space within the silo about the column 4 in a horizontal plane.

The rotation of the conveyor 10 in one direction causes the material to be gradually distributed over the total surface. The rotation of the screw conveyor 10 in the opposite direction causes the material to be scraped in the direction of the column 4 and, passing between the collar plates 5, shot down the vertical discharge duct 6. Below the bottom of the silo and below the column 4, there is provided in a known manner a discharge device 13 for directing the material outside the silo. When the conveyor is rotating, it passes through an ascending helical plane when filling, and the conveyor passes through a descending helical plane when discharging said material. The column 4 is adapted to this operation in that the collar plates 5 are likewise of a helical design, as is seen more clearly in FIG. 2. This helical path does not have to be even, but may as it were proceed stepwise, which will be explained with reference to FIG. 3. In such case the collar plates 5' are in a horizontal plane and the inclined portions 5" then constitute the joint to the neighboring collar plates above or below.

This affords providing in the clearance between the collar plates a scraper device which can pass through a path of travel about the vertical discharge duct, as will be explained with reference to FIG. 6. The helical form of embodiment as additionally explained in the FIGS. 4 and 5 makes it furthermore possible that, in addition to its rotary movement about the discharge duct, the scraper device can perform a movement in a vertical direction and pass through the successive clearances merging into one another between the collar plates 5 or 5'.

In order to use a column having collar plates about a central vertical discharge duct for a discharge installation according to the invention, the collar plates are fixed with the edge 14 thereof facing the discharge duct 6 to one or several partitions 15 running through the discharge duct. The partitions 15 need not run vertically, but may be in the form of a helical chute as indicated in FIG. 5 by the reference numeral 16. In radial direction, there is no need for the partition in the form of a chute to be plane, but it may be bent upwards in radial direction, so that the bulk material sliding down is not thrown between the collar plates 5 as a result of the centrifugal force.

Such an embodiment is especially suitable for materials subjected to wear due to colliding with each other, such as for instance coal. The sliding action to which this material is subjected has proved to be less detrimental to the such material than the effect of the mutual collision of the grains or pieces of material. By welding the edges 14 of the collar plates to the ends of the partitions facing said edges, the collar plates are continuous and enable using a scraper device thereon as apparent from FIG. 6.

In FIG. 6(a), an embodiment of the distribution and discharge conveyor 10 is composed of two conveyor screws 17 in addition, there is provided, relative to the direction of rotation as indicated by the arrow 18, and trailing the conveyor 10, a scraper device in the form of a separate conveyor screw 19 extending into the clearance between two neighboring collar plates 5. The direction of rotation of the conveyor screw 19 is such as to carry the material pushed or left upon the collar plate 5 into the discharge duct 6. This situation is diagrammatically shown in FIG. 7(b) as between two plates. The lower side of the blade of the worm of the conveyor screw 19 is located near the upper face of the collar plate 5 to be non-coaxial with conveyor screws 17.

Figure 9:
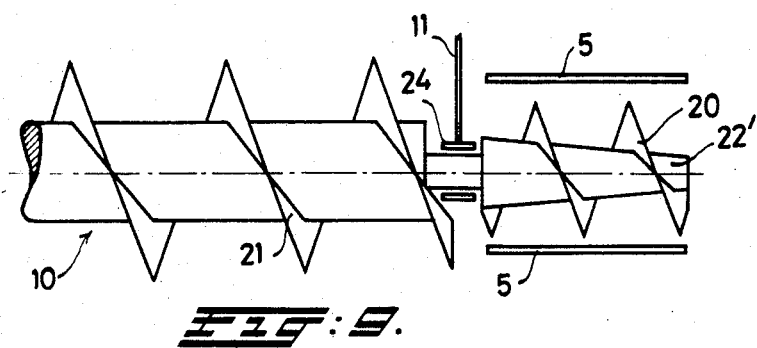
FIG. 9 is the same diagrammatic view as that of FIG. 8 but showing a modified embodiment of the scraper device.

In the case of the screw conveyors 21 of the distribution and discharge conveyor 10 illustrated in FIG. 6(b), cores coaxial thereof reach into the clearance between two neighboring collar plates 5, and are provided with a separate worm blade 20. This situation is likewise diagrammatically shown in FIG. 7(a). FIG. 7(c) discloses an alternative separate screw conveyor 19'. Instead of placing the scraper device 19 after the conveyor 10 in relation to the direction of travel thereof, the former can also be located at any point above the conveyor in the next clearance, as is diagrammatically indicated in FIG. 7 by the reference numeral 19'. In FIG. 8, the separate conveyor screw 19 has a cylindrical core 22 and the same applies to the core 23 of the conveyor 10. Both conveyors are supported in a bearing 24 suspended in the cable 11. In the embodiment as per FIG. 9, the core 22' of the screw conveyor 20 is cone-shaped, which has the advantage of precluding the risk of bulk material accumulating upon the plate 5, since the screw conveyor 20 is directed radially inwards towards the center of the vertical discharge duct. In this case as well, the screw conveyor 21 of the distribution and discharge conveyor 10 is suspended from the cable 11.

Figure 10:
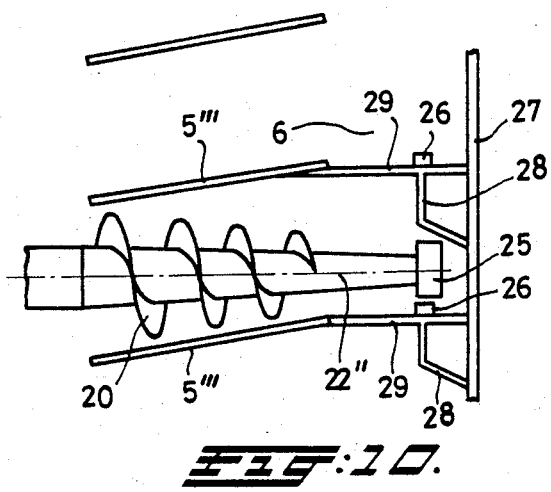
FIG. 10 is a diagrammatic side view of a third embodiment of a scraper device between two collar plates.

In the embodiment as per FIG. 10, the blades of the scraper device in the form of the screw conveyor 20 follow the conicity of the core 22". The inclination of the collar plates 5''' is then adapted to said conicity. The core 22" extends into the vertical discharge duct 6 and carries a guide roller 25 resting upon a guide 26 in the form of a rail. The guide 26 is supported on brackets 28 fastened to a rod 27 and also carrying supports for the collar plates 5'''. As the guide 26 will come into contact with the bulk material, there is provided on both sides of the guide roller 25 a scraper or brush (not shown). It is evident that a guide similar to a rail 26 can also be provided on the inside against the wall of the silo whereupon the distribution and discharge conveyor 10 can be guided as well.

It is also possible that of the distribution and discharge conveyors one of the conveyor screws 17, 21 in conjunction with the screw conveyors 19, 20 in the form of a scraper device associated therewith travel tangentially over the collar plates 5.

What is claimed is:

1. A discharge installation for a silo containing bulk material, comprising:
a column of collar plates disposed one above the other, adjacent plates merging into each other, each plate having a clearance toward the neighboring plate so that subsequent clearances form a mainly helical path, said collar plates enclosing a central space forming a vertical discharge duct, a rotating scraper device mounted substantially within said clearance and capable of traveling through said mainly helical path around said vertical discharge duct whereby clogging of the bulk material due to arching or caking in said clearances is avoided.

2. A discharge installation according to claim 1, further comprising a distribution and discharge conveyor positioned approximately perpendicular to said column and cooperating therewith, said scraper device cooperating with said conveyor, both the conveyor and the scraper device revolving about the vertical discharge duct and progressing in a vertical direction.

3. A discharge installation according to claim 2, wherein said scraper device comprises a conveyor worm.

4. A discharge installation according to claim 3, wherein said conveyor worm scraper device lies substantially coaxial with said conveyor worm.

5. A discharge installation according to claim 3, wherein the conveyor worm further comprises a helical blade which lies with a lower rim portion thereof near an adjacent collar plate upper face.

6. A discharge installation according to claim 1, in which a guide for an inner end of the scraper device is provided proximate to said vertical discharge duct.

7. The discharge installation according of claim 1 wherein said collar plates are fixed to one or more interior partitions vertically extending through said vertical discharge duct.

8. The discharge installation according to claim 7 wherein said interior partitions have a form of a substantially helical chute.

9. The discharge installation system of claim 7 further comprising a guide for said scraper device proximate to said vertical discharge duct.

10. A silo for storing bulk material, comprising:
storage means adapted to receive and discharge the bulk material;
discharge installation means interior to said storage means, including a column of collar plates disposed one above the other, adjacent plates merging into each other, each plate having a clearance toward the neighboring plate so that subsequent clearances form a mainly helical path, said collar plates enclosing a central space forming a vertical discharge duct, said discharge installation means further including a rotating scraper conveyor worm mounted within said clearance and being capable of traveling through said mainly helical path around said vertical discharge duct; and
distribution and discharge conveyor means positioned approximately perpendicular to said column and cooperating therewith, said conveyor worm cooperating with said distribution and discharge conveyor means, both said distribution and discharge conveyor means and said conveyor worm cooperatively revolving about said column so as to progress in a vertical direction.

* * * * *